US012563265B2

(12) United States Patent
Vitt et al.

(10) Patent No.: US 12,563,265 B2
(45) Date of Patent: *Feb. 24, 2026

(54) METHODS AND APPARATUS TO DETERMINE AUDIENCE ENGAGEMENT

(71) Applicant: The Nielsen Company (US), LLC, New York, NY (US)

(72) Inventors: James Joseph Vitt, Palm Harbor, FL (US); Timothy Scott Cooper, Tarpon Springs, FL (US); Douglas Brent Turnbow, Odessa, FL (US); Troy E. McClellan, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/775,039

(22) Filed: Jul. 17, 2024

(65) Prior Publication Data

US 2024/0373092 A1 Nov. 7, 2024

Related U.S. Application Data

(63) Continuation of application No. 17/974,492, filed on Oct. 26, 2022, now Pat. No. 12,069,336.

(51) Int. Cl.
 H04N 21/442 (2011.01)
 H04N 21/466 (2011.01)

(52) U.S. Cl.
 CPC ... H04N 21/44218 (2013.01); H04N 21/4667 (2013.01)

(58) Field of Classification Search
 None
 See application file for complete search history.

(56) References Cited

U.S. PATENT DOCUMENTS

| | | | | |
|---|---|---|---|---|
| 12,069,336 | B2 * | 8/2024 | Vitt .................. | H04N 21/44218 |
| 2014/0150002 | A1 * | 5/2014 | Hough ............... | H04N 21/4532 |
| | | | | 725/9 |
| 2014/0270683 | A1 * | 9/2014 | Zhu ........................ | G06F 16/436 |
| | | | | 386/224 |
| 2014/0337873 | A1 * | 11/2014 | Krug ...................... | H04H 60/33 |
| | | | | 725/18 |
| 2017/0070305 | A1 * | 3/2017 | Bowden ................. | H04H 60/33 |
| 2018/0220198 | A1 * | 8/2018 | Matthews ........ | H04N 21/25883 |
| 2019/0090020 | A1 * | 3/2019 | Srivastava ............ | G11B 27/28 |
| 2019/0188756 | A1 * | 6/2019 | Bradley ................. | G06V 40/16 |
| 2019/0320225 | A1 * | 10/2019 | Maughan ......... | H04N 21/44218 |
| 2020/0273485 | A1 * | 8/2020 | Jagmag ................. | G06N 3/047 |

\* cited by examiner

*Primary Examiner* — Alexander Q Huerta

(57) ABSTRACT

Methods, apparatus, systems, and articles of manufacture are disclosed. An example system includes: interface circuitry; programmable circuitry; and instructions to program the programmable circuitry to: obtain audio of a media presentation; obtain ambient noise in an area associated with the media presentation; determine an intensity of a difference between the audio and the ambient noise; and determine an engagement level of an audience of the media presentation based on a duration the intensity satisfies a threshold value.

20 Claims, 10 Drawing Sheets

METHODS AND APPARATUS TO DETERMINE AUDIENCE ENGAGEMENT

CROSS REFERENCE TO RELATED APPLICATIONS

This disclosure is a continuation of U.S. patent application Ser. No. 17/974,492, titled "METHODS AND APPARATUS TO DETERMINE AUDIENCE ENGAGEMENT," and filed on Oct. 26, 2022, now issued as U.S. Pat. No. 12,069,336, which is hereby incorporated by reference in its entirety.

FIELD OF THE DISCLOSURE

This disclosure relates generally to audience measurement and, more particularly, to methods and apparatus to determine audience engagement.

BACKGROUND

Audience measurement entities (AMEs) monitor user interaction with media devices, such as smartphones, tablets, laptops, smart televisions, etc. To facilitate such monitoring, AMEs enlist panelists and install meters at the media presentation locations of those panelists. The meters monitor media presentations and transmit media monitoring information to a central facility of the AME. Such media monitoring information enables the AMEs to, among other things, monitor exposure to advertisements, determine advertisement effectiveness, determine user behavior, identify purchasing behavior associated with various demographics, etc.

Figure 1:
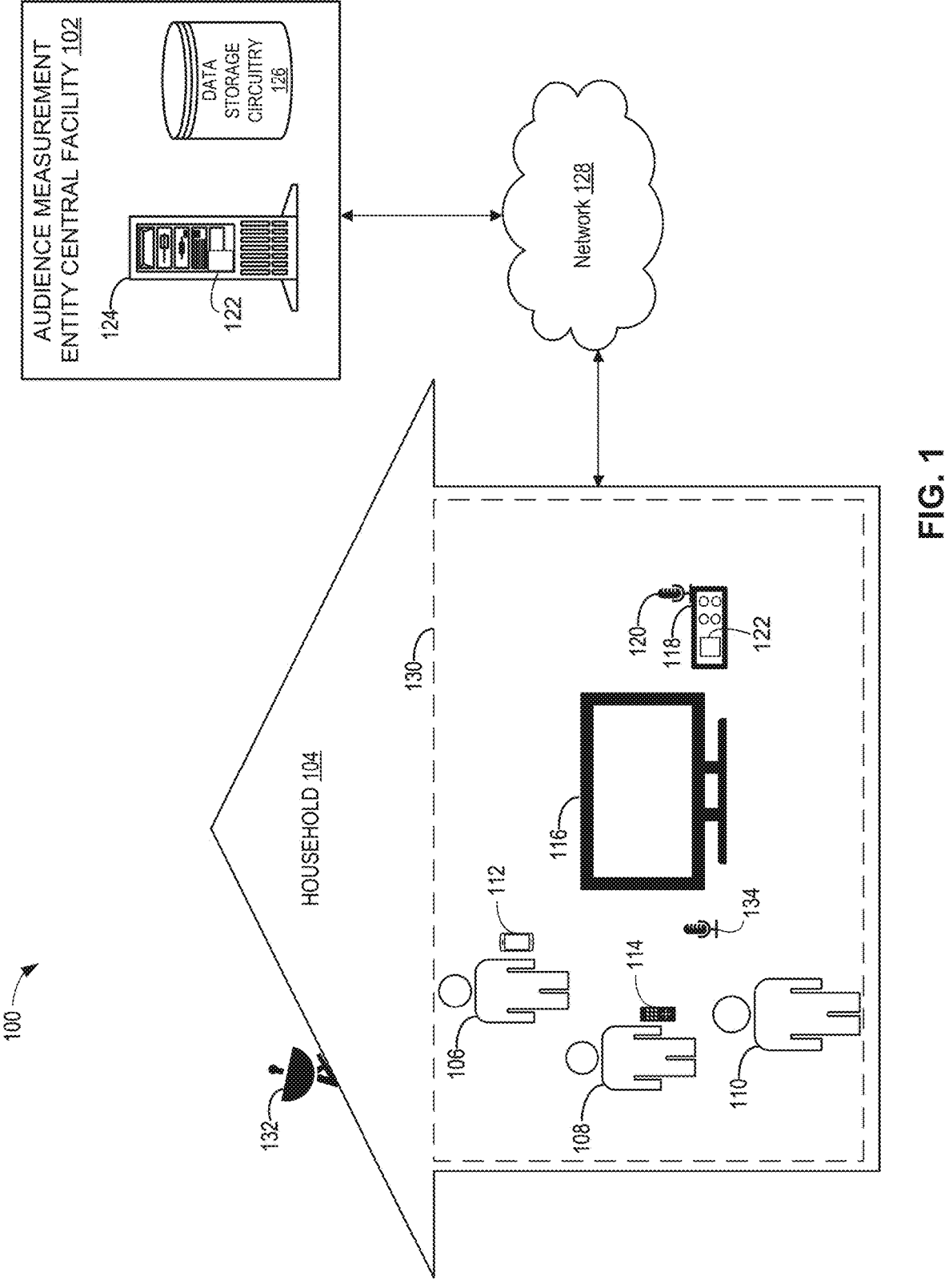
FIG. 1 depicts an example system that includes a central facility that may determine audience engagement for media presentations.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Audience measurement entities (AMEs) (also referred to herein as "ratings entities" or "monitoring companies") determine demographic reach for advertising and media programming based on registered panel members. That is, an audience measurement entity enrolls people that consent to being monitored into a panel. During enrollment, the audience measurement entity receives demographic information from the enrolling people so that subsequent correlations may be made between advertisement/media exposure to those panelists and different demographic markets. For example, AMEs desire knowledge on how users interact with media devices, such as smartphones, tablets, laptops, smart televisions, etc. In particular, AMEs monitor media presentations made at the media devices to, among other things, monitor exposure to advertisements, determine advertisement effectiveness, determine user behavior, identify purchasing behavior associated with various demographics, etc.

As used herein, the term "media" includes any type of content and/or advertisement delivered via any type of distribution medium. Thus, media includes television programming or advertisements, radio programming or advertisements, movies, web sites, streaming media, etc.

In addition to determining demographic reach for advertising and media programming based on registered panel members, audience measurement entities attempt to determine a viewer's engagement, focus, and/or attention to media exposure. To determine a viewer's attention to a media exposure, some example audience measurement entities employ one or more facial recognition cameras that determine if an audience member is actively viewing a media presentation device. However, such systems can be costly, demanding hardware such as cameras and IR lighting to capture a panelist's face and video processing software to determine if the panelist is looking at the screen. Furthermore, such systems may require privacy waivers from panelists.

Many media monitoring techniques are limited to determining exposure to TV programming without providing engagement metrics. Furthermore, such techniques often demand active participation by a panelist who indicates they are present by using a remote control to log in to a meter device. In such systems, an AME cannot determine if the panelist is actively engaged in the program they are exposed to.

As used herein, source audio may include electrical signals (e.g., analog and/or digital signals) that represent sound from a media source. As used herein, ambient noise may include any sound in an environment associated with a media presentation. Ambient noise may include sounds generated by panelists, viewers, media presentations, digital devices, speakers, pets, the environment (e.g., raindrops, wind, etc.). In some examples, ambient noise includes signals (e.g., audio signals, etc.) in a media presentation environment or household that are related to the media signals.

In examples disclosed herein, an area associated with the media presentation may include any area in which a panelist is capable of being exposed to the media. For example, a media presentation may be provided on a television in a living room of a panelist household. In such an example, the area associated with the media presentation may be the living room. However, in such an example, the area associated with the media presentation may extend beyond the living room (e.g., to an adjoining kitchen, through an open doorway, etc.). Thus, the boundaries of the area associated with the media exposure are based in part on the panelist's ability to be exposed to the media.

Example metering devices disclosed herein detect or measure panelist engagement, focus, and/or attention to media exposure(s). The example metering devices can be used with or without cameras and/or other facial recognition techniques for measuring user engagement. To detect or determine a panelist's attention to media exposure, example metering devices and related methods disclosed herein obtain source audio of a media presentation, obtain ambient noise in an area associated with the media presentation, determine an intensity of a difference between the source audio and the ambient noise, and determine an engagement level of an audience of the media presentation based on a duration the intensity satisfies a threshold value. Example methods may determine if a panelist is engaged or is distracted during a media presentation (e.g., based on an attention/distraction scale). For example, metering devices disclosed herein can detect ambient noise during media presentations that can be evaluated or analyzed to determine a panelist's attention or distraction during the media exposure.

Examples disclosed herein recognize that although media may be detected on a media device, the presentation of the media does not necessarily indicate that an audience is paying attention to (e.g., is engaged with) the media presentation. Examples disclosed herein generate engagement information (e.g., a degree of engagement, a likelihood of engagement, etc.) indicative of whether or not an audience member (e.g., a panelist member) is paying attention to a media presentation.

Examples disclosed herein may use metrics collected by a portable device to correlate the panelist's engagement with the ambient sound in the environment. For example, the portable device can be a portable/wearable meter (e.g., the portable people meter (PPM) of The Nielsen Company (US), LLC), a media meter in a media device (e.g., a TV), a smartphone, a smart speaker, etc. In examples disclosed herein, the portable device may include a microphone to collect ambient sound, which is used to determine audience engagement.

FIG. 1 is an example system 100 to determine audience engagement. In the illustrated example of FIG. 1, a household 104 has been statistically selected to develop media (e.g., television) ratings data for a population/demographic of interest. People become panelists via, for example, a user interface presented on a media device (e.g., via a media device 116, via a website, etc.). People become panelists in additional or alternative manners such as, for example, via a telephone interview, by completing an online survey, etc. Additionally or alternatively, people may be contacted and/ or enlisted using any desired methodology (e.g., random selection, statistical selection, phone solicitations, Internet advertisements, surveys, advertisements in shopping malls, product packaging, etc.). In some examples, an entire family may be enrolled as a household of panelists.

In the illustrated example, a first panelist 106, a second panelist 108, and a third panelist 110 of the household 104 have registered with an audience measurement entity (e.g., by agreeing to be a panelist) and have provided their demographic information to the audience measurement entity as part of a registration process to enable associating demographics with media exposure activities (e.g., television exposure, radio exposure, Internet exposure, etc.). The demographic data includes, for example, age, gender, income level, educational level, marital status, geographic location, race, etc., of a panelist.

In the illustrated example of FIG. 1, the household 104 includes an example media presentation environment 130. The example media presentation environment 130 is a living room in the household 104. However, the example media presentation environment 130 can additionally or alternatively be any other type(s) of environment(s) such as, for example, a theater, a restaurant, a tavern, a retail location, an arena, etc.

In the illustrated example of FIG. 1, the example media device 116 is a television. However, the example media device 116 can correspond to any type of audio, video, and/or multimedia presentation device capable of presenting media audibly and/or visually. In some examples, the media device 116 (e.g., a television) may communicate audio to another media presentation device (e.g., an audio/video receiver) for output by one or more speakers (e.g., surround sound speakers, a sound bar, etc.). As another example, the media device 116 can correspond to a multimedia computer system, a personal digital assistant, a cellular/mobile smartphone, a radio, a home theater system, stored audio and/or video played back from a memory such as a digital video recorder or a digital versatile disc, a webpage, and/or any other communication device capable of presenting media to an audience (e.g., the panelists 106, 108, and 110).

A media source 132 is shown in the illustrated example of FIG. 1. The media source 132 is a satellite dish. However, in some examples the media source 132 may be any means to provide media from media provider(s), such as, but not limited to, a cable media service provider, a radio frequency (RF) media provider, an Internet based provider (e.g., IPTV), a satellite media service provider, etc. The media may be radio media, television media, pay per view media, movies, Internet Protocol Television (IPTV), satellite television (TV), Internet radio, satellite radio, digital television, digital radio, stored media (e.g., a compact disk (CD), a Digital Versatile Disk (DVD), a Blu-ray disk, etc.), any other type(s) of broadcast, multicast and/or unicast medium, audio and/or video media presented (e.g., streamed) via the Internet, a video game, targeted broadcast, satellite broadcast, video on demand, etc.

The example media device 116 of the illustrated example shown in FIG. 1 is a device that receives media from the media source 132 for presentation. In some examples, the media device 116 is capable of directly presenting media (e.g., via a display) while, in other examples, the media device 116 presents the media on separate media presentation equipment (e.g., speakers, a display, etc.). Thus, as used herein, "media devices" may or may not be able to present media without assistance from a second device. Media devices are typically consumer electronics. For example, the media device 116 of the illustrated example could be a personal computer such as a laptop computer, and, thus, capable of directly presenting media (e.g., via an integrated and/or connected display and speakers). In some examples, the media device 116 can correspond to a television and/or display device that supports the National Television Standards Committee (NTSC) standard, the Phase Alternating Line (PAL) standard, the Système Électronique pour Couleur avec Mémoire (SECAM) standard, a standard developed by the Advanced Television Systems Committee (ATSC), such as high definition television (HDTV), a standard developed by the Digital Video Broadcasting (DVB) Project, etc. Advertising, such as an advertisement and/or a preview of other programming that is or will be offered by the media source 132, etc., is also typically included in the media. While a television is shown in the illustrated example, any other type(s) and/or number(s) of media device(s) may additionally or alternatively be used. For example, Internet-enabled mobile handsets (e.g., a smartphone, an iPod®, etc.), video game consoles (e.g., Xbox®, PlayStation 3, etc.), tablet computers (e.g., an iPad®, a Motorola™ Xoom™, etc.), digital media players (e.g., a Roku® media player, a Slingbox®, a Tivo®, etc.), smart televisions, desktop computers, laptop computers, servers, etc. may additionally or alternatively be used.

In the illustrated example, a media device meter 118 can be physically coupled to the media device 116 or may be configured to capture signals emitted externally by the media device 116 (e.g., free field audio) such that direct physical coupling to the media device 116 is not required. For example, the media device meter 118 of the illustrated example may employ non-invasive monitoring not involving any physical connection to the media device 116 (e.g., via Bluetooth® connection, WIFI® connection, acoustic watermarking, etc.) and/or invasive monitoring involving one or more physical connections to the media device 116 (e.g., via USB connection, a High Definition Media Interface (HDMI) connection, an Ethernet cable connection, etc.).

The example media device meter 118 detects exposure to media and electronically stores monitoring information (e.g., a code/watermark detected with the presented media, a signature of the presented media, an identifier of a panelist present at the time of the presentation, a timestamp of the time of the presentation) of the presented media. The stored monitoring information is then transmitted back to the AME central facility 102 via a network 128. In some examples, the stored monitoring information is transmitted to example data storage circuitry 126 included in the AME central facility 102 for processing the monitoring information. In some examples, ambient noise data is not transmitted to the AME central facility 102, while source audio data is transmitted to the AME central facility 102.

In examples disclosed herein, to monitor media presented by the media device 116, the media device meter 118 of the illustrated example employs audio watermarking techniques and/or signature based-metering techniques. Audio watermarking is a technique used to identify media, such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component of the media. In some examples, the audio or video component is selected to have a signal characteristic sufficient to hide the watermark. As used herein, the terms "code" and "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a timer interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature.

For example, the media device meter 118 of the illustrated example senses audio (e.g., acoustic signals or ambient audio) output (e.g., emitted) by the media device 116. For example, the media device meter 118 processes the signals obtained from the media device 116 to detect media and/or source identifying signals (e.g., audio watermarks) embedded in portion(s) (e.g., audio portions) of the media presented by the media device 116. To sense ambient audio output by the media device 116, the media device meter 118 of the illustrated example includes a first audio sensor 120 (e.g., a first microphone) and a second audio sensor 134 (e.g., a second microphone). In some examples, the media device meter 118 may process audio signals obtained from the media device 116 via a direct cable connection to detect media and/or source identifying audio watermarks embedded in such audio signals. In some examples, the media device meter 118 may process audio signals to generate respective audio signatures from the media presented by the media device 116.

To generate exposure data for the media, identification(s) of media to which the audience is exposed are correlated with people data (e.g., presence information) collected by the media device meter 118. The media device meter 118 of the illustrated example collects inputs (e.g., audience monitoring data) representative of the identities of the audience member(s) (e.g., the panelists 106, 108, and 110). In some examples, the media device meter 118 collects audience monitoring data by periodically or non-periodically prompting audience members in the monitored media presentation environment 130 to identify themselves as present in the audience (e.g., audience identification information). In some examples, the media device meter 118 responds to events (e.g., the media device 116 is turned on, a channel change, detection of an infrared control signal, etc.) by prompting the audience member(s) to self-identify.

In some examples, the media device meter 118 is positioned in a location such that the first audio sensor 120 (e.g., the first microphone 120) receives ambient audio produced by the television and/or other devices of the media presentation environment 130 with sufficient quality to identify media presented by the media device 116 and/or other devices of the media presentation environment 130 (e.g., a surround sound speaker system). For example, in examples disclosed herein, the media device meter 118 and a first audio sensor (e.g., the first microphone 120) may be placed on top of a television, secured to a bottom portion of a television, etc.

In the illustrated example of FIG. 1, the example second microphone 134 detects ambient sound in the media presentation environment 130. In some examples, the meter(s) 112 and/or 114 are portable people meter(s) (PPM(s)) of The Nielsen Company (US), LLC, wearable meter(s), smartphone(s), etc. In some examples, the meter(s) 112, 114 are associated with panelist(s) (e.g., the panelists 106, 108, and 110). The example meter(s) 112, 114 include an audio sensor (e.g., a microphone) to collect ambient audio data from the media presentation environment 130. In some examples, the meter(s) 112, 114 collect ambient sound that includes sound generated by the media device 116 (e.g., the television) and sound generated by the panelist(s) 106, 108, and/or 110. In some examples, the meter(s) 112, 114 determine engagement information for associated panelist(s) (e.g., the panelists 106, 108, and 110) based on the ambient audio data collected by the meter(s) 112, 114, the media device meter 118, and/or the first and second microphones 120 and 134.

The network 128 of the illustrated example is a wide area network (WAN) such as the Internet. However, in some examples, local networks may additionally or alternatively be used. Moreover, the example network 128 may be implemented using any type of public or private network, such as, but not limited to, the Internet, a telephone network, a local area network (LAN), a cable network, and/or a wireless network, or any combination thereof.

The AME central facility 102 of the illustrated example is implemented by one or more AME servers 124. The AME central facility 102 processes and stores data received from the media device meter 118 and the meters 112, 114. Additionally or alternatively, the AME central facility 102 can be implemented via a cloud service (e.g., AWS®, etc.). In this example, the AME central facility 102 can further store and process generated watermark and signature reference data.

The example AME server 124 processes the collected media identifying information and/or data received by the media device meter 118 to detect, identify, credit, etc., respective media assets and/or portions thereof (e.g., media segments) associated with the corresponding data. For example, the AME server 124 determines signature matches between the monitored signatures and reference signatures and credits the media assets associated with the media identifying information of the monitored signatures. For example, the AME server 124 can compare the media identifying information to generated reference data to determine what respective media is associated with the corresponding media identifying information. The AME server 124 of the illustrated example also analyzes the media identifying information to determine if the media asset(s), and/or particular portion(s) (e.g., segment(s)) thereof, associated with the signature match and/or watermark match is (are) to be credited. In some examples, the AME server 124 also collects engagement information/data from the example meters 112, 114 to associate with the media exposure data identified by the media device meter 118. The example engagement analysis circuitry 122 may credit media exposure to an identified media asset and also determines engagement information for that media exposure (e.g., was the panelist actually engaged/paying attention to the media during the media exposure). In the illustrated example of FIG. 1, the example engagement analysis circuitry 122 is shown in both the example media device meter 118 and the example AME server 124. Thus, operations of the engagement analysis circuitry 122 may be performed in the household 104, the AME central facility 102, and/or both the household 104 and the AME central facility 102. In some examples, one or more of the processes described in relation to FIG. 2 and/or FIGS. 3-6 may be performed in the household 104 (e.g., performed by the media device meter 118) and one or more of the processes described in relation to FIG. 2 and/or FIGS. 3-6 may be performed in the audience measurement entity central facility 102 (e.g., performed by the AME server 124).

Figure 2:
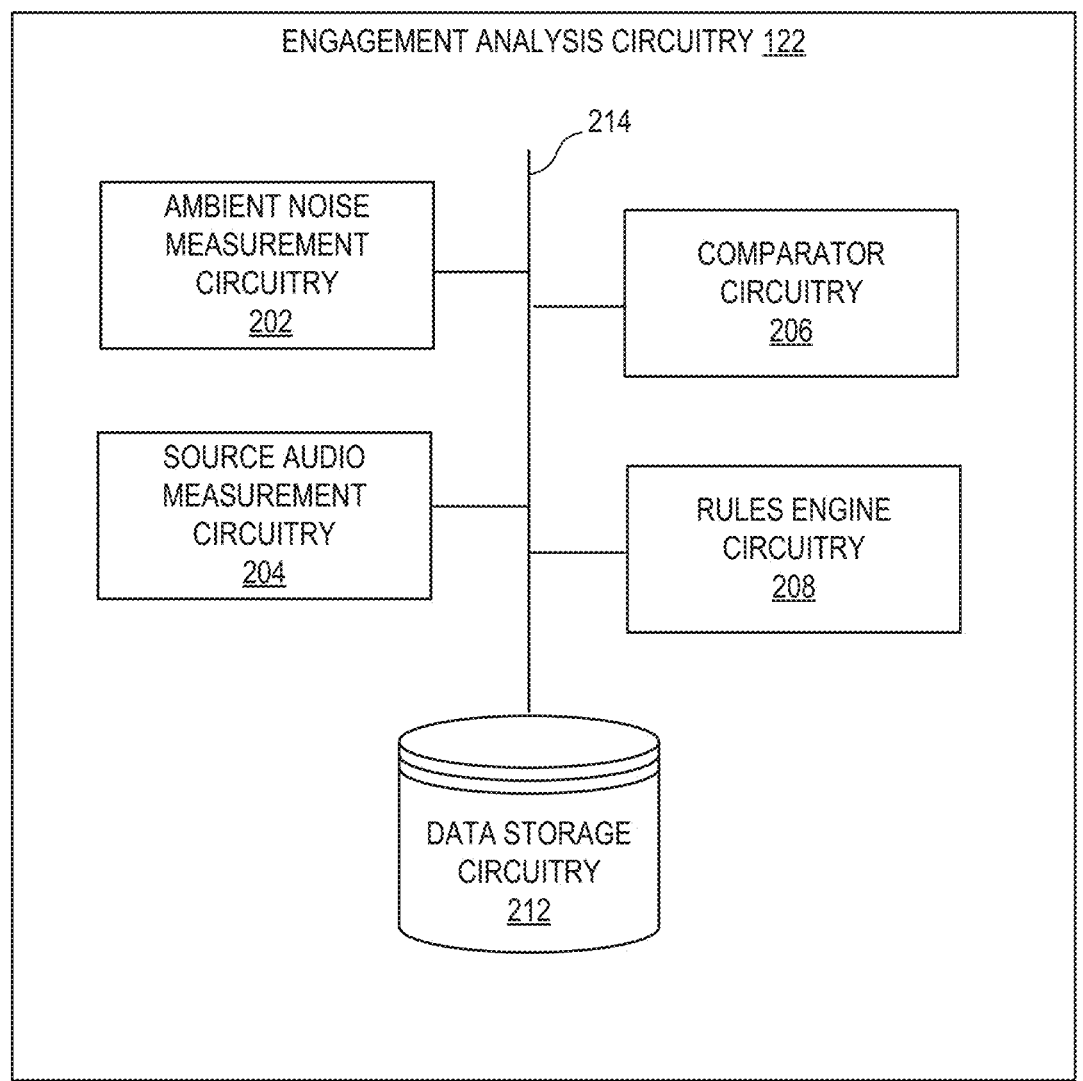
FIG. 2 is a block diagram of example engagement analysis circuitry to determine audience engagement for media presentations.

FIG. 2 is a block diagram of engagement analysis circuitry 122 to determine audience engagement with a media presentation. The engagement analysis circuitry 122 of FIG. 2 may be instantiated (e.g., creating an instance of, bring into being for any length of time, materialize, implement, etc.) by processor circuitry such as a central processing unit executing instructions. Additionally or alternatively, the engagement analysis circuitry 122 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by one or more virtual machines and/or containers executing on the microprocessor.

The engagement analysis circuitry 122 includes ambient noise measurement circuitry 202. Ambient noise may include any sound in an environment, whether or not the sound is associated with a media presentation. For example, ambient noise may include both audio from a media presentation and noise generated by panelists (e.g., panelists talking, panelists watching media not associated with the media presentation device 116 of FIG. 1, etc.). The ambient noise measurement circuitry 202 obtains audio from a front facing microphone (e.g., the second microphone 134 of FIG. 1).

The example ambient noise measurement circuitry 202 may measure an intensity of an ambient noise sample. For example, the ambient noise measurement circuitry 202 may measure ambient noise in decibels and provide the measurement to rules engine circuitry 208, and/or comparator circuitry 206 for further analysis. In some examples, the ambient noise measurement circuitry 202 may measure ambient sound at regular intervals (e.g., sample every 10 seconds, sample every 100 seconds, sample every 1000 seconds, etc.).

In some examples, the ambient noise measurement circuitry 202 may measure sound in an environment (e.g., a room) with a front-facing microphone or microphone array. In some examples, the ambient noise measurement circuitry 202 may obtain audio from a meter device (e.g., the meter devices 112, 114 of FIG. 1). The ambient noise measurement circuitry 202 may also provide measurements of ambient audio to data storage circuitry 212 via a bus 214.

In some examples, the apparatus includes means for measuring ambient noise in an environment associated with a media presentation. For example, the means for measuring may be implemented by ambient noise measurement circuitry 202. In some examples, the ambient noise measurement circuitry 202 may be instantiated by processor circuitry such as the example processor circuitry 712 of FIG. 7. For instance, the ambient noise measurement circuitry 202 may be instantiated by the example general purpose processor circuitry 800 of FIG. 8 executing machine executable instructions such as that implemented by at least blocks 304 of FIG. 3, 404 of FIG. 4, and 504 of FIG. 5. In some examples ambient noise measurement circuitry 202 may be instantiated by hardware logic circuitry, which may be implemented by an ASIC or the FPGA circuitry 900 of FIG. 9 structured to perform operations corresponding to the machine readable instructions. Additionally or alternatively, the ambient noise measurement circuitry 202 may be instantiated by any other combination of hardware, software, and/or firmware. For example, the ambient noise measurement circuitry 202 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example engagement analysis circuitry 122 includes source audio measurement circuitry 204. The example source audio measurement circuitry 204 measures media audio that is presented to an audience. The source audio measurement circuitry 204 may perform a direct monitoring of audio of a media presentation. For example, direct monitoring of the audio of the media presentation may be performed by tapping an audio output on a media presentation device (e.g., the media device 116 of FIG. 1). In other examples, the source audio measurement circuitry 204 may obtain the source audio based on a microphone (e.g., the first microphone 120 of FIG. 1) that is directed to a media device speaker (e.g., the media device 116 of FIG. 1). In such an example, by placing a microphone proximate to and facing a speaker of a media presentation device, the example source audio measurement circuitry 202 may obtain a direct measurement of the source audio with less ambient noise.

The example source audio measurement circuitry 204 may also obtain information about a media presentation that includes the source audio. For example, the source audio measurement circuitry 204 may obtain information related to playback of the media (e.g., fast-forward, skip, pause), a genre of the media (e.g., sporting event, comedy, drama, etc.). Such information may be provided to the rules engine circuitry 208 to classify sound from the audience.

In some examples, the apparatus includes means for measuring source audio in an environment associated with a media presentation. For example, the second means for measuring may be implemented by source audio measurement circuitry 204. In some examples, the source audio measurement circuitry 204 may be instantiated by processor circuitry such as the example processor circuitry 712 of FIG. 7. For instance, the source audio measurement circuitry 204 may be instantiated by the example general purpose processor circuitry 800 of FIG. 8 executing machine executable instructions such as that implemented by at least blocks 302 of FIG. 3, 404 of FIG. 4, and 504 of FIG. 5. In some examples the source audio measurement circuitry 204 may be instantiated by hardware logic circuitry, which may be implemented by an ASIC or the FPGA circuitry 900 of FIG. 9 structured to perform operations corresponding to the machine readable instructions. Additionally or alternatively, the source audio measurement circuitry 204 may be instantiated by any other combination of hardware, software, and/or firmware. For example, the source audio measurement circuitry 204 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example engagement analysis circuitry 122 includes example comparator circuitry 206. The example comparator circuitry 206 compares ambient noise provided by the ambient noise measurement circuitry 202 and source audio provided by the source audio measurement circuitry 204. The comparator circuitry may determine an intensity (e.g., a value in decibels) of a difference between ambient noise in an environment and a source audio measurement. The comparator circuitry 206 may also determine a period of time (e.g., a length of time) the intensity satisfies a threshold value. For example, the comparator circuitry 206 may determine a period of time the intensity is greater than a first threshold value. The comparator circuitry 206 may also determine a second period of time the intensity is less than a second threshold value. Then, based on the first and second determinations, the comparator circuitry may identify temporary fluctuations in intensity and provide this information to rules engine circuitry 208 for classification of the audience sound.

The comparator circuitry 206 may determine one or more portions of the ambient noise that correspond to the source audio. After the identification, the comparator circuitry 206 may determine a remaining portion of the source audio is associated with an audience (e.g., an audience sound). The comparator circuitry 206 may then determine the audience sound is associated with a panelist and/or is not associated with a panelist. The identification may be performed by providing the audience sound and any other identifying information (e.g., metadata related to audience/panelists, metadata related to media that is presented, etc.) to the rules engine circuitry 208.

In some examples, the apparatus includes means for comparing ambient noise to source audio. For example, the means for comparing may be implemented by the comparator circuitry 206. In some examples, the comparator circuitry 206 may be instantiated by processor circuitry such as the example processor circuitry 712 of FIG. 7. For instance, the comparator circuitry 206 may be instantiated by the example general purpose processor circuitry 800 of FIG. 8 executing machine executable instructions such as that implemented by at least blocks 306 of FIG. 3, 406-410 of FIG. 4, and 506-510 of FIG. 5. In some examples comparator circuitry 206 may be instantiated by hardware logic circuitry, which may be implemented by an ASIC or the FPGA circuitry 900 of FIG. 9 structured to perform operations corresponding to the machine readable instructions. Additionally or alternatively, the comparator circuitry 206 may be instantiated by any other combination of hardware, software, and/or firmware. For example, the comparator circuitry 206 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example engagement analysis circuitry 122 includes the rules engine circuitry 208. The rules engine circuitry 208 obtains information from the comparator circuitry 206 regarding any differences (e.g., intensity of difference, duration of difference, etc.) between ambient noise and source audio of a media presentation. Based on the difference and any additional information provided by the ambient noise measurement circuitry 202 and/or the source audio measurement circuitry 204 (e.g., audience metrics, genre of source audio, tuning information, media control, etc.), the rules engine circuitry 208 determines audience engagement. In some examples, the rules engine circuitry 208 assigns an engagement classification to the media presentation that indicates how engaged the audience of the media is. For example, the rules engine circuitry 208 may categorize an audience engagement (e.g., categorize as low engagement, medium engagement, high engagement) based on a rules engine (e.g., a series of rules to categorize engagement). The rules engine circuitry 208 may then generate a code (e.g., a code for engagement data categorizing the engagement) to pair with crediting information for a presenter of the media presentation. Such information may be transmitted to an AME (e.g., the AME server 124 of FIG. 1). In some examples, all source audio and ambient noise data is maintained within the presentation environment (e.g., the home) to provide enhanced panelist privacy.

Figure 4:
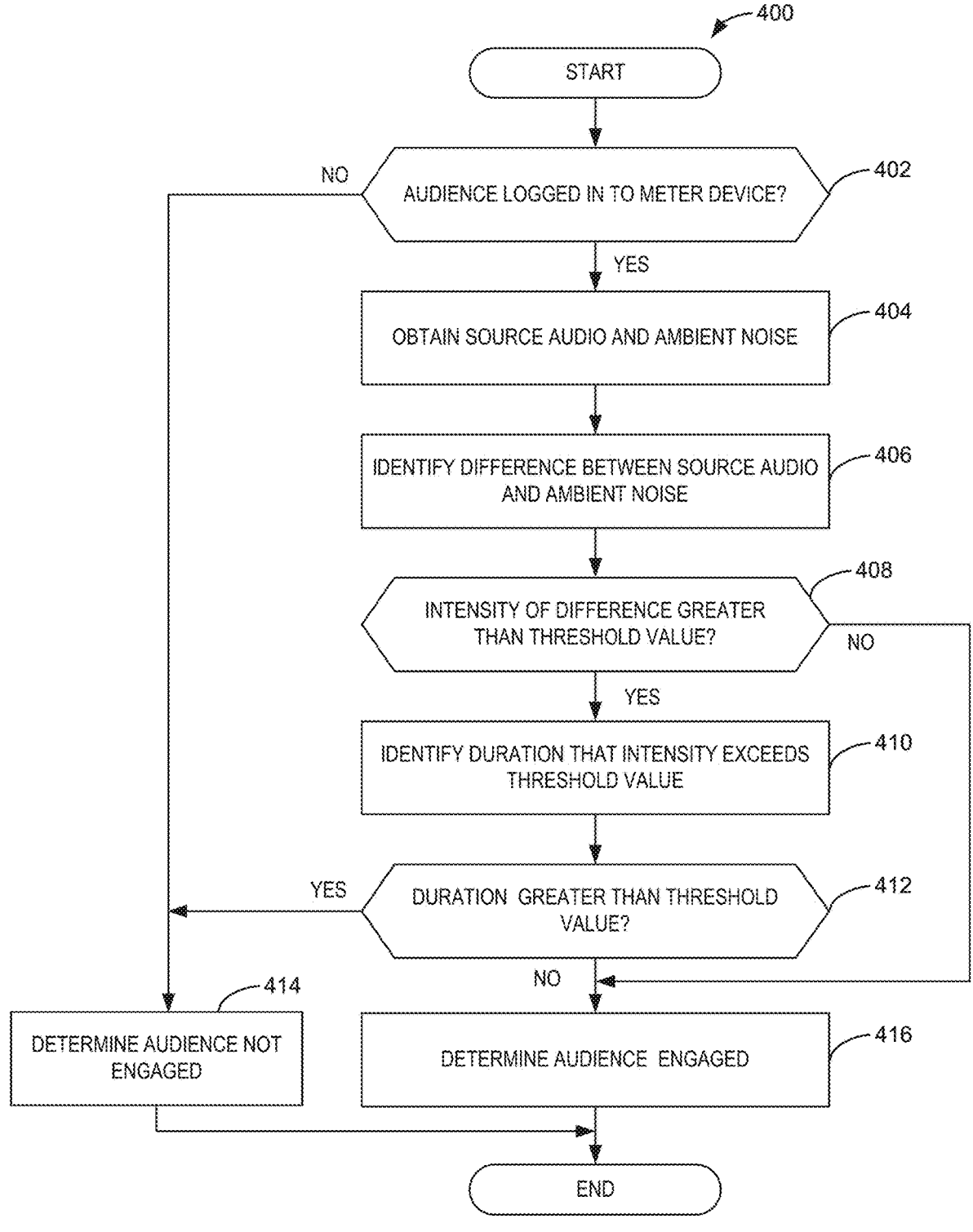
FIG. 4 is another flowchart representative of example machine readable instructions and/or example operations that may be executed by example processor circuitry to determine audience engagement.

The rules engine circuitry 208 may make an engagement classification based on, for example, rules that are predetermined (e.g., based on experimentation and/or heuristics). In some examples, the rules may be included in a classification tree that evaluates input data provided by the comparator circuitry 206, the ambient noise measurement circuitry 202, and/or the source audio measurement circuitry 204 according to a series of rules. An example of using the rules engine circuitry 208 determining audience engagement is shown in FIG. 4.

For example, a first rule may be that a difference in sound intensity (e.g., volume, decibel level, signal strength) between an ambient noise and a source audio that is less than a threshold value indicates an audience is engaged. A second rule may be that if the difference in sound intensity is greater than a threshold value, the audience is not engaged. These rules may be based on an observation that if an audience is not engaged in a media presentation, they may begin talking or performing another activity. Such activities increases ambient noise in the room without altering the source audio.

Thus, if a difference between source audio and ambient noise in an environment exceeds a threshold, the audience may be categorized as distracted and/or not engaged with the media presentation. Engagement may further be categorized as low, medium, or high based on, for example, the intensity of the difference between ambient noise and source audio. The categorization may also be based on duration elevated ambient noise and/or a classification of a type of ambient noise. In some examples, engagement is assigned a continuous value (e.g., an engagement metric, an engagement rating) that is inversely proportional to audience noise and/or room noise (e.g., based on a difference between source audio and ambient noise).

Another rule may determine engagement based on characteristics of source audio and/or a media presentation. For example, sporting events may be associated with rules that account for an excited (e.g., active, relatively loud) audience. In another example, an audience engaged with a drama may be relatively silent, generating relatively less ambient noise. Yet, in such a scenario, the audience of the drama may be similarly engaged with the media as the audience of the sporting event. Therefore, the engagement analysis circuitry 122 may generate improved engagement metrics by analyzing characteristics (e.g., media genre(s)) of the source audio. Furthermore, in some examples, the engagement analysis circuitry 122 may determine engagement based on an expected duration of ambient noise associated with a media playback. For example, an audience engaged with a horror movie may generate short, intense bursts of ambient noise. In some examples, an engagement confidence value can be determined that increases in response to combination of a classification and an additional audience behavior, such as a channel change or control of the media presentation (e.g., play media, pause media, fast-forward media, slow media, etc.).

Another rule may determine that, in response to a difference between source audio and ambient noise being less than a threshold value, the audience is either highly engaged, asleep, or involved in a quiet activity. Further rules may be used to identify which of these categories most accurately represents the audience engagement. For example, if the audience is involved in a quiet activity, such as browsing an app on a phone, there may be still be short bursts of uncorrelated noise from the phone as the panelist scrolls through the app. Another rule may identify certain types of ambient noise as pet noise. For example, animal sounds like dogs barking can be identified based on the rules engine circuitry 208. Another rule may identify that when a panelist is farther away from a microphone (e.g., panelist is in a large media presentation environment), the expected intensity of ambient noise generated by the panelist is relatively less. Therefore, a rule may adjust an engagement value and/or engagement categorization based on a distance of a panelist and/or audience from the microphone.

In some examples, the rules engine circuitry 208 may include a rule that alters a classification based on a panelist being identified as present based on activity of a meter device. Furthermore, any of the above rules may be modified based on changes in the source audio and/or changes to the environment caused by the audience (e.g., an audio volume change or a channel change).

In some examples, the rules engine circuitry 208 (e.g., and/or more generally, the engagement analysis circuitry 122) may include neural network circuitry to classify ambient noise, generate audience measurement classifications, and/or modify audience measurement classifications. For example, neural network circuitry of the rules engine circuitry 208 may implement a convolutional neural network that includes various convolutional layers, max pooling layers, fixed embedding layers, global averaging layers, etc. In some examples, the example neural network circuitry may include additional and/or alternative machine learning models to predict a class label for input ambient noise, source audio, source audio metadata, and/or output of the comparator circuitry 206. For example, the rules engine circuitry 208 may interoperate with other classification algorithms (e.g., logistic regression, naive bayes, k-nearest neighbors, decision tree, support vector machine) to provide improved classification results for audience engagement. The example rules engine circuitry 208 may also include neural network training circuitry and/or retrieve training data from the example data storage circuitry 212, which can be used to train an engagement classifier. In some examples, the neural network circuitry may perform pre-processing on the training data and/or deduplicate elements of the training set before training.

In some examples, the apparatus includes means for determining audience engagement based on rules and/or a machine learning classifier. For example, the means for determining may be implemented by rules engine circuitry 208. In some examples, the rules engine circuitry 208 may be instantiated by processor circuitry such as the example processor circuitry 712 of FIG. 7. For instance, the rules engine circuitry 208 may be instantiated by the example general purpose processor circuitry 800 of FIG. 8 executing machine executable instructions such as that implemented by at least blocks 306 of FIGS. 3, 402 and 408-416 of FIG. 4, 506-512 of FIG. 5, and/or 602-606 of FIG. 6. In some examples the rules engine circuitry 208 may be instantiated by hardware logic circuitry, which may be implemented by an ASIC or the FPGA circuitry 900 of FIG. 9 structured to perform operations corresponding to the machine readable instructions. Additionally or alternatively, the ambient noise measurement circuitry 202 may be instantiated by any other combination of hardware, software, and/or firmware. For example, the ambient noise measurement circuitry 202 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the engagement analysis circuitry 122 of FIG. 1 is illustrated in FIG. 2, one or more of the elements, processes, and/or devices illustrated in FIG. 2 may be combined, divided, re-arranged, omitted, eliminated, and/or implemented in any other way. Further, the example ambient noise measurement circuitry 202, the example source audio measurement circuitry 204, the example comparator circuitry 206, the example rules engine circuitry 208, the example data storage circuitry 212, and/or more generally the example engagement analysis circuitry 122 of FIG. 1, may be implemented by hardware alone or by hardware in combination with software and/or firmware. Thus, for example, any of the example ambient noise measurement circuitry 202, the example source audio measurement circuitry 204, the example comparator circuitry 206, the example rules engine circuitry 208, the example data storage circuitry 212, and/or more generally the example engagement analysis circuitry 122 of FIG. 1, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example engagement analysis circuitry 122 of FIG. 1 may include one or more elements, processes, and/or devices in addition to, or instead of, those illustrated in FIG. 2, and/or may include more than one of any or all of the illustrated elements, processes and devices.

Flowcharts representative of example hardware logic circuitry, machine readable instructions, hardware implemented state machines, and/or any combination thereof for implementing the engagement analysis circuitry 122 is shown in FIGS. 3-6. The machine readable instructions may be one or more executable programs or portion(s) of an executable program for execution by processor circuitry, such as the processor circuitry 712 shown in the example processor platform 700 discussed below in connection with FIG. 7 and/or the example processor circuitry discussed below in connection with FIGS. 8 and/or 9 (e.g., the microprocessor 800 and/or the FPGA circuitry 900. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 3, many other methods of implementing the example engagement analysis circuitry 122 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 3-6 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 3:
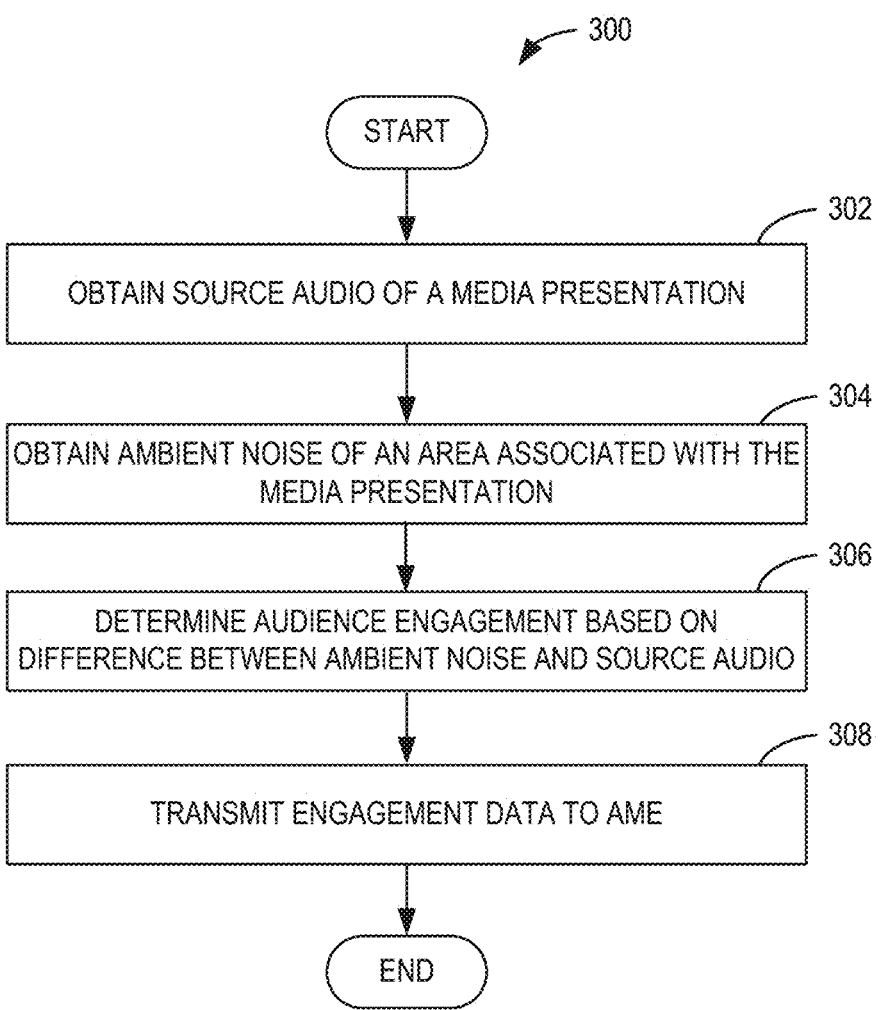
FIG. 3 is a flowchart representative of example machine readable instructions and/or example operations that may be executed by example processor circuitry to implement the engagement analysis circuitry of FIG. 2 to determine audience engagement.

FIG. 3 is a flowchart representative of example machine readable instructions and/or example operations 300 that may be executed and/or instantiated by processor circuitry to implement the engagement analysis circuitry of FIG. 2 to determine audience engagement. The machine readable instructions and/or the operations 300 of FIG. 3 begin at block 302, at which the source audience measurement circuitry 204 of FIG. 2 obtains source audio of a media presentation. At block 304, the example ambient measurement circuitry 202 of FIG. 2 obtains ambient noise of an area associated with the media presentation. Next, at block 306, the example comparator circuitry 206 of FIG. 2 and/or the example rules engine circuitry 208 of FIG. 2 determines audience engagement based on a difference between ambient noise and source audio. Finally, at block 308, the example engagement analysis circuitry 122 of FIG. 2 transmits engagement data to an AME server. The instructions end.

FIG. 4 is a flowchart representative of example machine readable instructions and/or example operations 400 that may be executed and/or instantiated by processor circuitry to implement the rules engine circuitry 208 of FIG. 2. The machine readable instructions and/or the operations 400 of FIG. 4 begin at block 402, at which the example engagement analysis circuitry 122 of FIG. 2 determines if a panelist and/or audience is logged in to a meter device. If so, the instructions continue at block 404 at which the example ambient noise measurement circuitry 202 of FIG. 2 and/or the example source audio measurement circuitry 204 of FIG. 2 obtain source audio and ambient noise. Otherwise, control continues at block 414, at which the rules engine circuitry 208 of FIG. 2 determines the audience is not engaged.

At block 406, the example comparator circuitry 206 of FIG. 2 identifies a difference between source audio and ambient noise. Then, at block 408, the example rules engine circuitry 208 of FIG. 2 determines if an intensity of the difference is greater than a threshold value. If so, control continues at block 410 at which the example rules engine circuitry 208 of FIG. 2 identifies a duration the intensity exceeds the threshold value. Otherwise, the instructions continue at block 416 at which the example rules engine circuitry 208 of FIG. 2 determines the audience is engaged.

At block 412, the example rules engine circuitry 208 of FIG. 2 determines if the duration is greater than threshold value. If so, the instructions continue at block 414 at which the rules engine circuitry 208 of FIG. 2 determines the audience is not engaged. Otherwise, control continues at block 416 at which the example rules engine circuitry 208 of FIG. 2 determines an audience is engaged. The instructions end.

Figure 5:
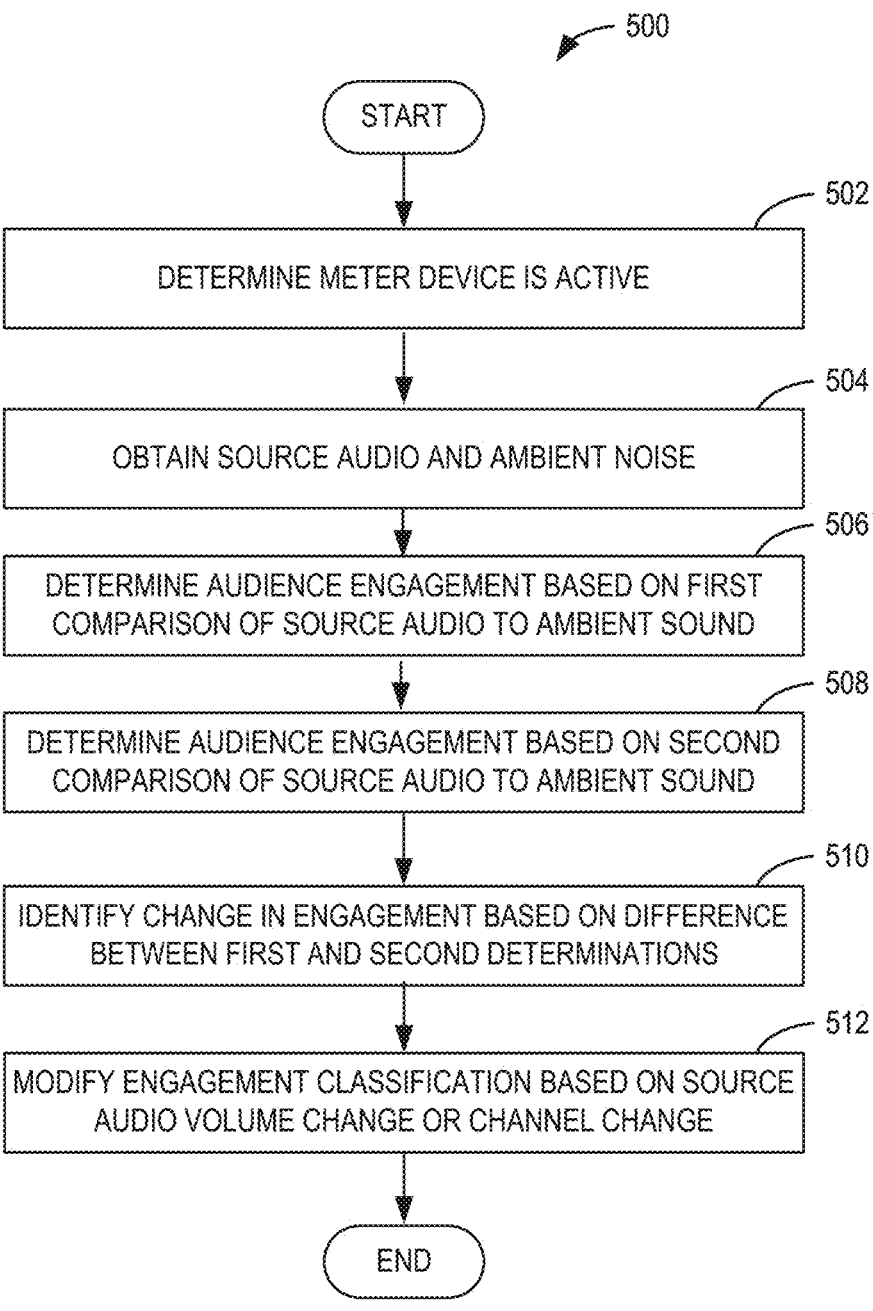
FIG. 5 is a flowchart representative of example machine readable instructions and/or example operations that may be executed by example processor circuitry to modify an audience engagement classification.

FIG. 5 is a flowchart representative of example machine readable instructions and/or example operations 500 that may be executed and/or instantiated by processor circuitry to implement the engagement analysis circuitry 122 of FIG. 2 to modify an audience engagement classification. The machine readable instructions and/or the operations 500 of FIG. 5 begin at block 502, at which the example engagement analysis circuitry 122 of FIG. 2 determines if a meter device is active. At block 504, the ambient noise measurement circuitry 202 of FIG. 2 and/or the source audio measurement circuitry 204 of FIG. 2 obtain source audio and ambient noise. At block 506, the example rules engine circuitry 208 of FIG. 2 determines audience engagement based on first comparison of source audio to ambient sound. At block 508, the rules engine circuitry 208 of FIG. 2 determines audience engagement based on second comparison of source audio to ambient sound. At block 510, the rules engine circuitry 208 of FIG. 2 identifies a change in engagement based on a difference between the first and second determinations. At block 512, the rules engine circuitry 208 of FIG. 2 modifies an engagement classification based on a source audio volume change or a channel change. The instructions end.

Figure 6:
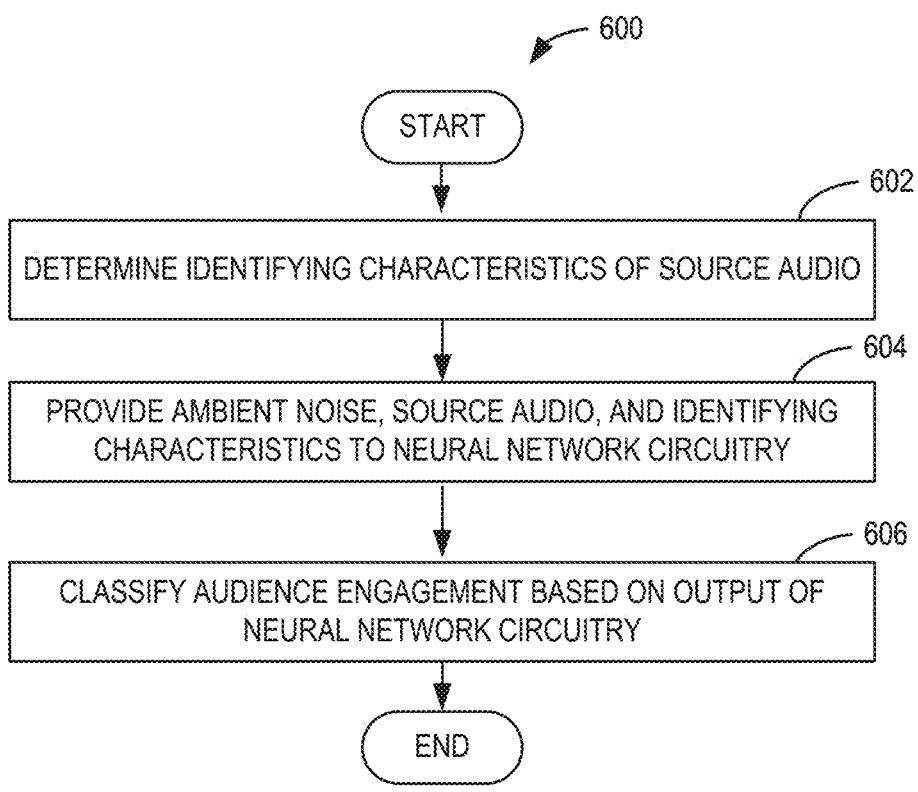
FIG. 6 is a flowchart representative of example machine readable instructions and/or example operations that may be executed by example processor circuitry to classify audience engagement based on neural network circuitry.

FIG. 6 is a flowchart representative of example machine readable instructions and/or example operations 600 that may be executed and/or instantiated by processor circuitry to implement the engagement analysis circuitry 122 of FIG. 2 to classify audience engagement based on a machine learning classification. The machine readable instructions and/or the operations 600 of FIG. 6 begin at block 602, at which the source audio measurement circuitry 204 of FIG. 2 determines identifying characteristics of source audio. At block 604, the example ambient noise measurement circuitry 202 of FIG. 2, the example source audio measurement circuitry 204 of FIG. 2, and/or the example comparator circuitry 206 of FIG. 2 provide ambient noise, source audio, and source audio identifying characteristics to the rules engine circuitry 208 of FIG. 2. At block 606, the example rules engine circuitry 208 of FIG. 2 classifies audience engagement based on output of neural network circuitry. The instructions end.

Figure 7:
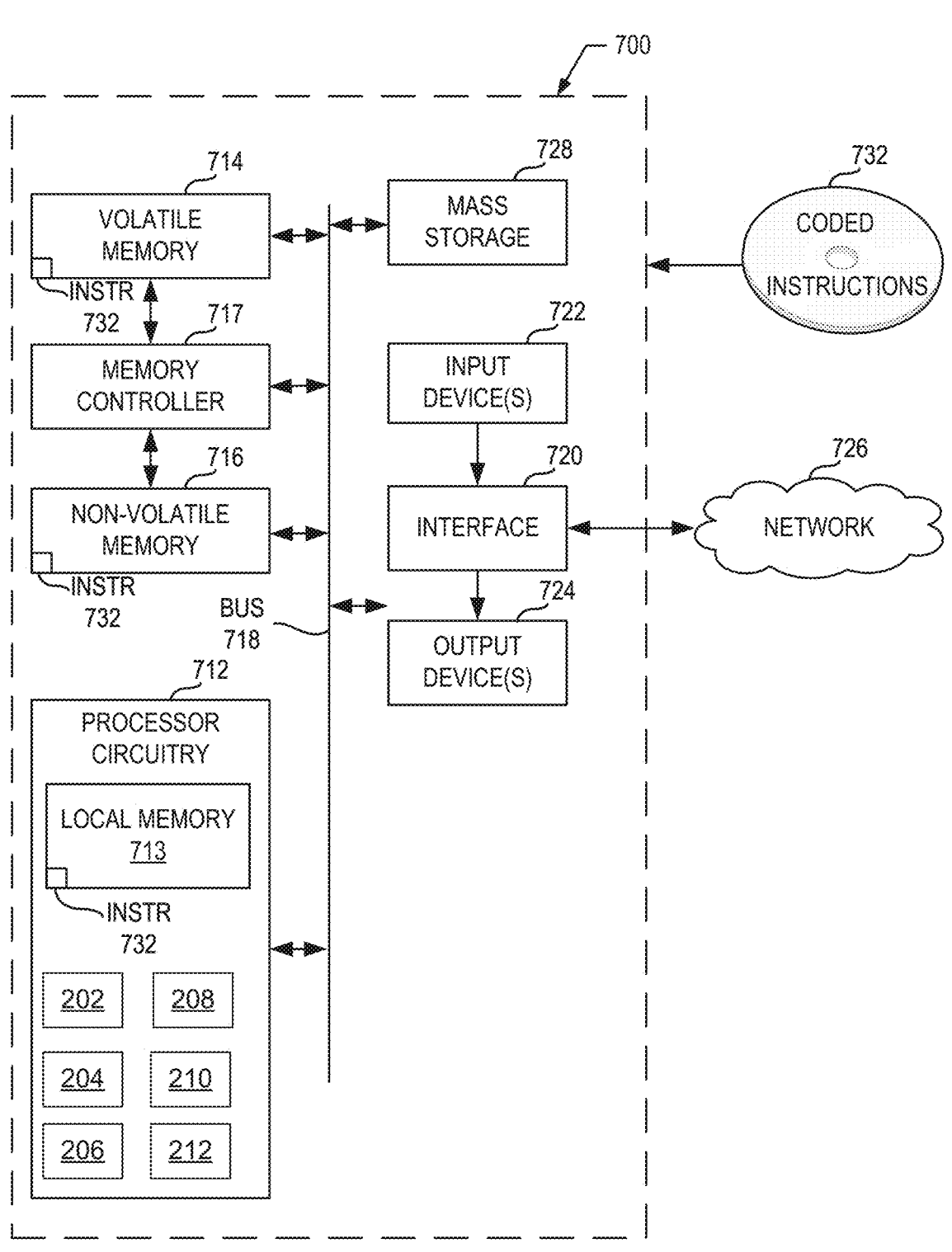
FIG. 7 is a block diagram of an example processing platform including processor circuitry structured to execute the example machine readable instructions and/or the example operations of FIGS. 3-6 to implement the engagement analysis circuitry of FIG. 2.

FIG. 7 is a block diagram of an example processor platform 700 structured to execute and/or instantiate the machine readable instructions and/or the operations of FIGS. 3-6 to implement the engagement analysis circuitry 122 of FIG. 2. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 700 of the illustrated example includes processor circuitry 712. The processor circuitry 712 of the illustrated example is hardware. For example, the processor circuitry 712 can be implemented by one or more integrated circuits, logic circuits, FPGAs, microprocessors, CPUs, GPUs, DSPs, and/or microcontrollers from any desired family or manufacturer. The processor circuitry 712 may be implemented by one or more semiconductor based (e.g., silicon based) devices. In this example, the processor circuitry 712 implements ambient noise measurement circuitry 202, the example source audio measurement circuitry 204, the example comparator circuitry 206, the example rules engine circuitry 208, and/or the example data storage circuitry 212.

The processor circuitry 712 of the illustrated example includes a local memory 713 (e.g., a cache, registers, etc.). The processor circuitry 712 of the illustrated example is in communication with a main memory including a volatile memory 714 and a non-volatile memory 716 by a bus 718. The volatile memory 714 may be implemented by Synchronous Dynamic Random Access Memory (SDRAM), Dynamic Random Access Memory (DRAM), RAMBUS®

Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717.

The processor platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 722 are connected to the interface circuitry 720. The input device(s) 722 permit(s) a user to enter data and/or commands into the processor circuitry 712. The input device(s) 722 can be implemented by, for example, an audio sensor, a microphone, a camera (still or video), a keyboard, a button, a mouse, a touchscreen, a track-pad, a trackball, an isopoint device, and/or a voice recognition system.

One or more output devices 724 are also connected to the interface circuitry 720 of the illustrated example. The output device(s) 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 700 of the illustrated example also includes one or more mass storage devices 728 to store software and/or data. Examples of such mass storage devices 728 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 732, which may be implemented by the machine readable instructions of FIGS. 3-6, may be stored in the mass storage device 728, in the volatile memory 714, in the non-volatile memory 716, and/or on a removable non-transitory computer readable storage medium such as a CD or DVD.

Figure 8:
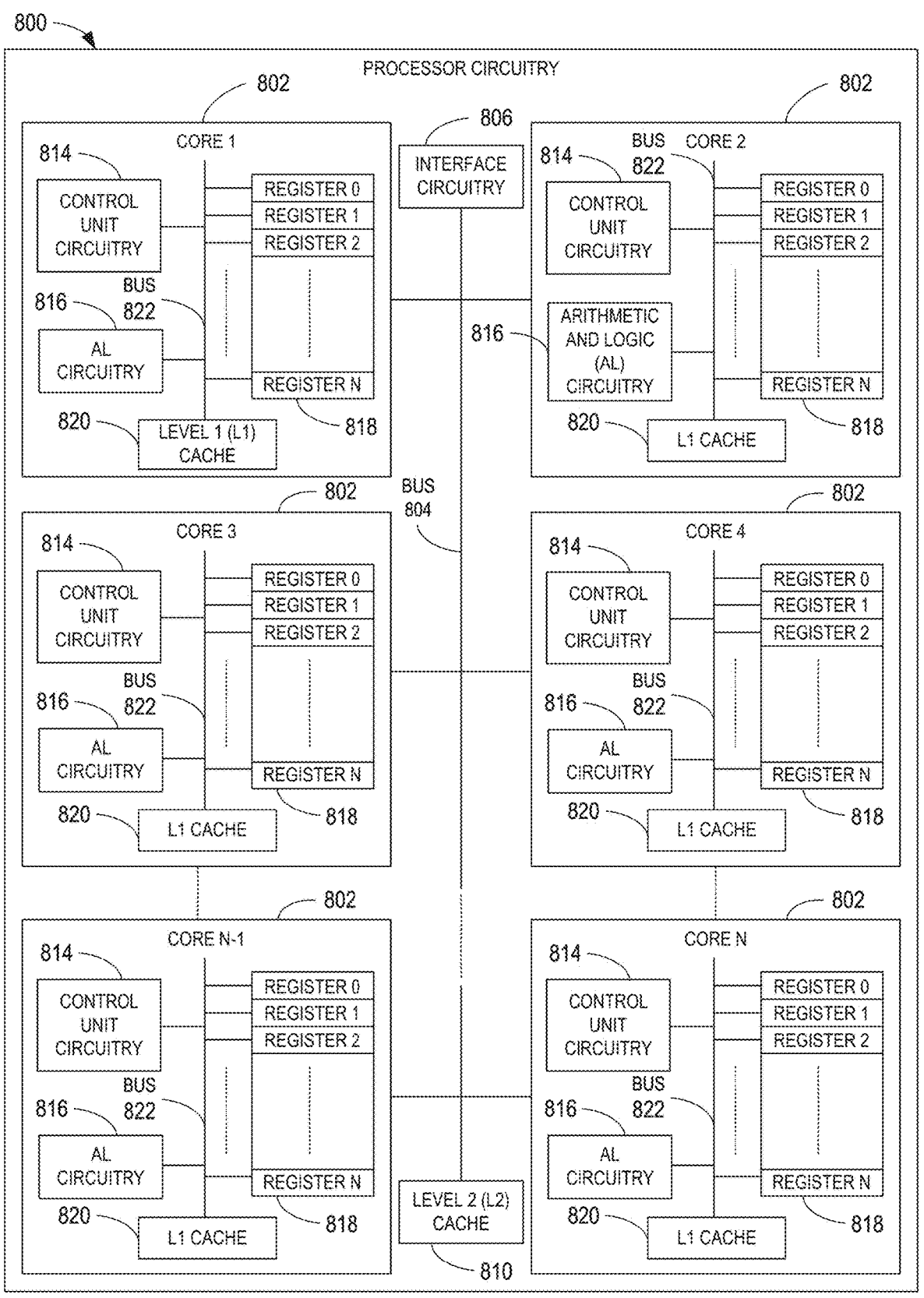
FIG. 8 is a block diagram of an example implementation of the processor circuitry of FIG. 7.

FIG. 8 is a block diagram of an example implementation of the processor circuitry 712 of FIG. 7. In this example, the processor circuitry 712 of FIG. 7 is implemented by a general purpose microprocessor 800. The general purpose microprocessor circuitry 800 executes some or all of the machine readable instructions of the flowcharts of FIG. 3-6 to effectively instantiate the circuitry of FIG. 2 as logic circuits to perform the operations corresponding to those machine readable instructions. In some such examples, the circuitry of FIG. 8 is instantiated by the hardware circuits of the microprocessor 800 in combination with the instructions. For example, the microprocessor 800 may implement multi-core hardware circuitry such as a CPU, a DSP, a GPU, an XPU, etc. Although it may include any number of example cores 802 (e.g., 1 core), the microprocessor 800 of this example is a multi-core semiconductor device including N cores. The cores 802 of the microprocessor 800 may operate independently or may cooperate to execute machine read-able instructions. For example, machine code corresponding to a firmware program, an embedded software program, or a software program may be executed by one of the cores 802 or may be executed by multiple ones of the cores 802 at the same or different times. In some examples, the machine code corresponding to the firmware program, the embedded soft-ware program, or the software program is split into threads and executed in parallel by two or more of the cores 802. The software program may correspond to a portion or all of the machine readable instructions and/or operations repre-sented by the flowchart of FIGS. 3-6.

The cores 802 may communicate by a first example bus 804. In some examples, the first bus 804 may implement a communication bus to effectuate communication associated with one(s) of the cores 802. For example, the first bus 804 may implement at least one of an Inter-Integrated Circuit (I2C) bus, a Serial Peripheral Interface (SPI) bus, a PCI bus, or a PCIe bus. Additionally or alternatively, the first bus 804 may implement any other type of computing or electrical bus. The cores 802 may obtain data, instructions, and/or signals from one or more external devices by example interface circuitry 806. The cores 802 may output data, instructions, and/or signals to the one or more external devices by the interface circuitry 806. Although the cores 802 of this example include example local memory 820 (e.g., Level 1 (L1) cache that may be split into an L1 data cache and an L1 instruction cache), the microprocessor 800 also includes example shared memory 810 that may be shared by the cores (e.g., Level 2 (L2_ cache)) for high-speed access to data and/or instructions. Data and/or instruc-tions may be transferred (e.g., shared) by writing to and/or reading from the shared memory 810. The local memory 820 of each of the cores 802 and the shared memory 810 may be part of a hierarchy of storage devices including multiple levels of cache memory and the main memory (e.g., the main memory 714, 716 of FIG. 7). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 802 may be referred to as a CPU, DSP, GPU, etc., or any other type of hardware circuitry. Each core 802 includes control unit circuitry 814, arithmetic and logic (AL) circuitry (sometimes referred to as an ALU) 816, a plurality of registers 818, the L1 cache 820, and a second example bus 822. Other structures may be present. For example, each core 802 may include vector unit circuitry, single instruction multiple data (SIMD) unit circuitry, load/store unit (LSU) circuitry, branch/jump unit circuitry, floating-point unit (FPU) circuitry, etc. The control unit circuitry 814 includes semiconductor-based circuits structured to control (e.g., coordinate) data movement within the corresponding core 802. The AL circuitry 816 includes semiconductor-based circuits structured to perform one or more mathematic and/or logic operations on the data within the corresponding core 802. The AL circuitry 816 of some examples performs integer based operations. In other examples, the AL circuitry 816 also performs floating point operations. In yet other examples, the AL circuitry 816 may include first AL cir-cuitry that performs integer based operations and second AL circuitry that performs floating point operations. In some examples, the AL circuitry 816 may be referred to as an Arithmetic Logic Unit (ALU). The registers 818 are semi-conductor-based structures to store data and/or instructions such as results of one or more of the operations performed by the AL circuitry 816 of the corresponding core 802. For example, the registers 818 may include vector register(s), SIMD register(s), general purpose register(s), flag register(s), segment register(s), machine specific register(s), instruction pointer register(s), control register(s), debug reg-ister(s), memory management register(s), machine check register(s), etc. The registers 818 may be arranged in a bank as shown in FIG. 8. Alternatively, the registers 818 may be organized in any other arrangement, format, or structure including distributed throughout the core 802 to shorten access time. The second bus 822 may implement at least one of an I2C bus, a SPI bus, a PCI bus, or a PCIe bus Each core 802 and/or, more generally, the microprocessor 800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 800 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelera-tors may be on-board the processor circuitry, in the same chip package as the processor circuitry and/or in one or more separate packages from the processor circuitry.

Figure 9:
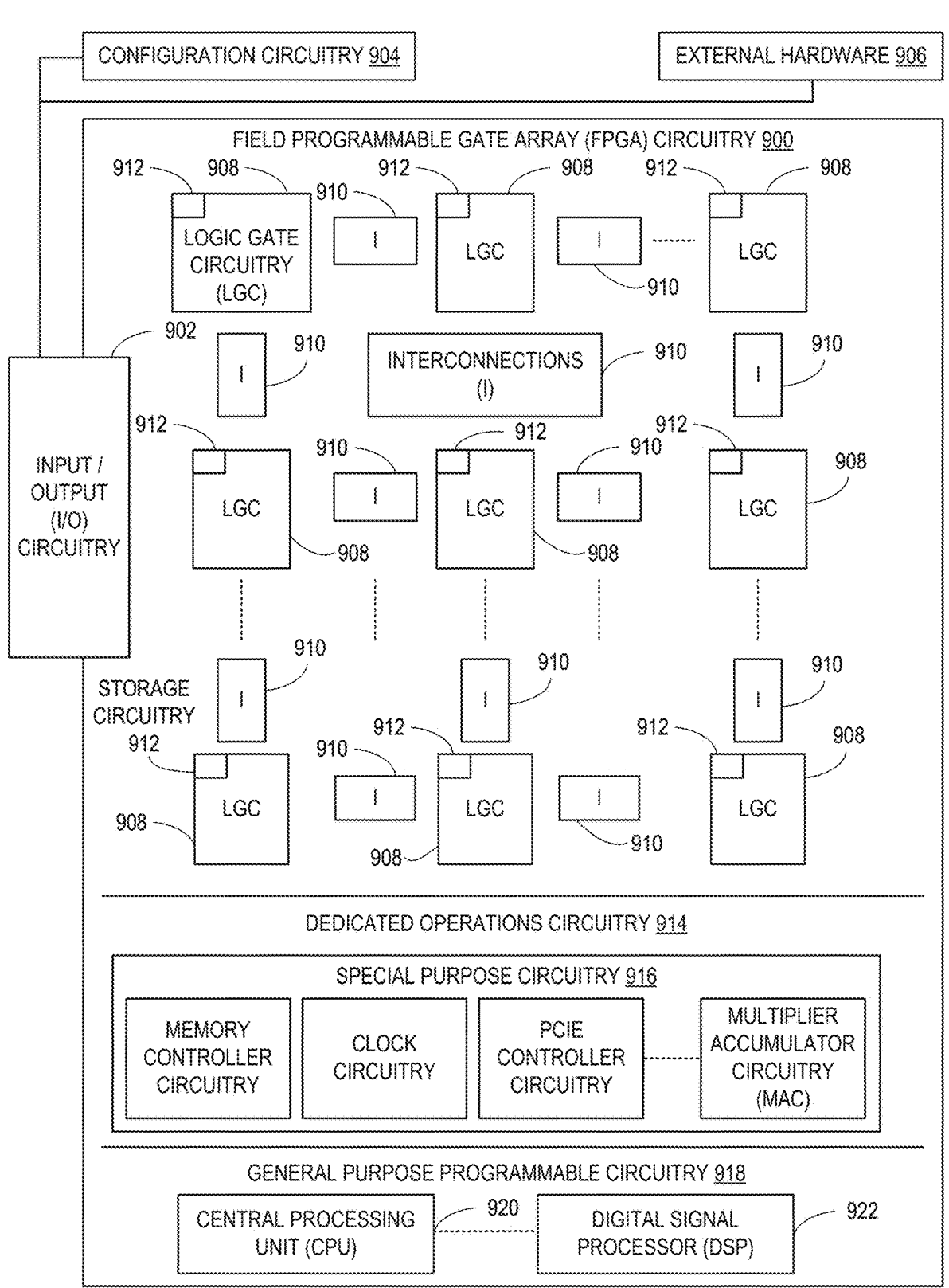
FIG. 9 is a block diagram of another example implementation of the processor circuitry of FIG. 7.

FIG. 9 is a block diagram of another example implemen-tation of the processor circuitry 712 of FIG. 7. In this example, the processor circuitry 700 is implemented by FPGA circuitry 900. The FPGA circuitry 900 can be used, for example, to perform operations that could otherwise be performed by the example microprocessor 800 of FIG. 8 executing corresponding machine readable instructions. However, once configured, the FPGA circuitry 900 instan-tiates the machine readable instructions in hardware and, thus, can often execute the operations faster than they could be performed by a general purpose microprocessor execut-ing the corresponding software.

More specifically, in contrast to the microprocessor 800 of FIG. 8 described above (which is a general purpose device that may be programmed to execute some or all of the machine readable instructions represented by the flowcharts of FIG. 3-6 but whose interconnections and logic circuitry are fixed once fabricated), the FPGA circuitry 900 of the example of FIG. 9 includes interconnections and logic circuitry that may be configured and/or interconnected in different ways after fabrication to instantiate, for example, some or all of the machine readable instructions represented by the flowcharts of FIGS. 3-6. In particular, the FPGA 900 may be thought of as an array of logic gates, interconnec-tions, and switches. The switches can be programmed to change how the logic gates are interconnected by the inter-connections, effectively forming one or more dedicated logic circuits (unless and until the FPGA circuitry 900 is reprogrammed). The configured logic circuits enable the logic gates to cooperate in different ways to perform different operations on data received by input circuitry. Those operations may correspond to some or all of the software represented by the flowcharts of FIG. 3-6. As such, the FPGA circuitry 900 may be structured to effectively instantiate some or all of the machine readable instructions of the flowcharts of FIGS. 3-6 as dedicated logic circuits to perform the operations corresponding to those software instructions in a dedicated manner analogous to an ASIC. Therefore, the FPGA circuitry 900 may perform the operations corresponding to the some or all of the machine readable instructions of FIGS. 3-6 faster than the general purpose microprocessor can execute the same.

In the example of FIG. 9, the FPGA circuitry 900 is structured to be programmed (and/or reprogrammed one or more times) by an end user by a hardware description language (HDL) such as Verilog. The FPGA circuitry 900 of FIG. 9, includes example input/output (I/O) circuitry 902 to obtain and/or output data to/from example configuration circuitry 904 and/or external hardware (e.g., external hardware circuitry) 906. For example, the configuration circuitry 904 may implement interface circuitry that may obtain machine readable instructions to configure the FPGA circuitry 900, or portion(s) thereof. In some such examples, the configuration circuitry 904 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 906 may implement the microprocessor 800 of FIG. 8. The FPGA circuitry 900 also includes an array of example logic gate circuitry 908, a plurality of example configurable interconnections 910, and example storage circuitry 912. The logic gate circuitry 908 and interconnections 910 are configurable to instantiate one or more operations that may correspond to at least some of the machine readable instructions of FIGS. 3-6 and/or other desired operations. The logic gate circuitry 908 shown in FIG. 9 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 908 to enable configuration of the electrical structures and/or the logic gates to form circuits to perform desired operations. The logic gate circuitry 908 may include other electrical structures such as look-up tables (LUTs), registers (e.g., flip-flops or latches), multiplexers, etc.

The interconnections 910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 908 to program desired logic circuits.

The storage circuitry 912 of the illustrated example is structured to store result(s) of the one or more of the operations performed by corresponding logic gates. The storage circuitry 912 may be implemented by registers or the like. In the illustrated example, the storage circuitry 912 is distributed amongst the logic gate circuitry 908 to facilitate access and increase execution speed.

The example FPGA circuitry 900 of FIG. 9 also includes example Dedicated Operations Circuitry 914. In this example, the Dedicated Operations Circuitry 914 includes special purpose circuitry 916 that may be invoked to implement commonly used functions to avoid the need to program those functions in the field. Examples of such special purpose circuitry 916 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 900 may also include example general purpose programmable circuitry 918 such as an example CPU 920 and/or an example DSP 922. Other general purpose programmable circuitry 918 may additionally or alternatively be present such as a GPU, an XPU, etc., that can be programmed to perform other operations.

Although FIGS. 8 and 9 illustrate two example implementations of the processor circuitry 712 of FIG. 7, many other approaches are contemplated. For example, as mentioned above, modern FPGA circuitry may include an on-board CPU, such as one or more of the example CPU 920 of FIG. 9. Therefore, the processor circuitry 712 of FIG. 7 may additionally be implemented by combining the example microprocessor 800 of FIG. 8 and the example FPGA circuitry 900 of FIG. 9. In some such hybrid examples, a first portion of the machine readable instructions represented by the flowcharts of FIGS. 3-6 may be executed by one or more of the cores 802 of FIG. 8, a second portion of the machine readable instructions represented by the flowcharts of FIGS. 3-6 may be executed by the FPGA circuitry 900 of FIG. 9 and/or a third portion of the machine readable instructions represented by the flowcharts of FIGS. 3-6 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 712 of FIG. 7 may be in one or more packages. For example, the processor circuitry 800 of FIG. 8 and/or the FPGA circuitry 900 of FIG. 9 may be in one or more packages. In some examples, an XPU may be implemented by the processor circuitry 712 of FIG. 7, which may be in one or more packages. For example, the XPU may include a CPU in one package, a DSP in another package, a GPU in yet another package, and an FPGA in still yet another package.

Figure 10:
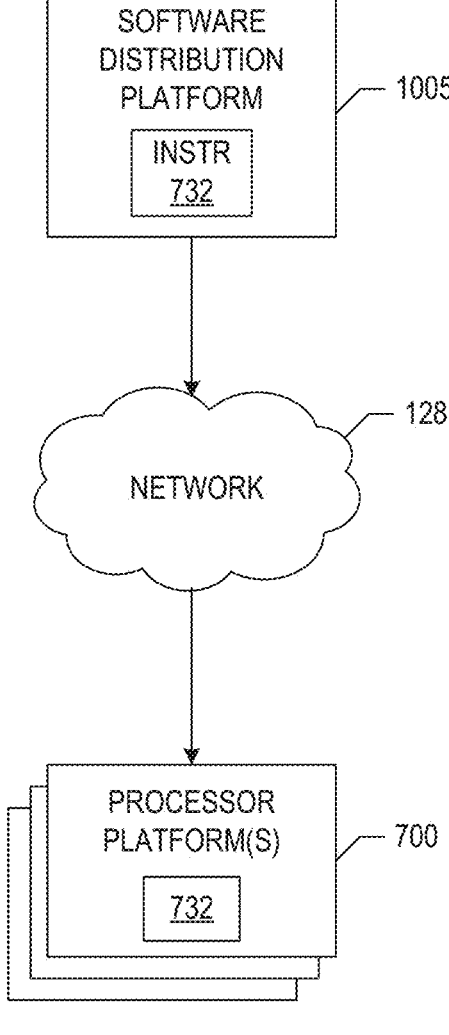
FIG. 10 is a block diagram of an example software distribution platform (e.g., one or more servers) to distribute software (e.g., software corresponding to the example machine readable instructions of FIGS. 3-6) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1005 to distribute software such as the example machine readable instructions 732 of FIG. 7 to hardware devices owned and/or operated by third parties is illustrated in FIG. 10. The example software distribution platform 1005 may be implemented by any computer server, data facility, cloud service, etc., capable of storing and transmitting software to other computing devices. The third parties may be customers of the entity owning and/or operating the software distribution platform 1005. For example, the entity that owns and/or operates the software distribution platform 1005 may be a developer, a seller, and/or a licensor of software such as the example machine readable instructions 732 of FIG. 7. The third parties may be consumers, users, retailers, OEMs, etc., who purchase and/or license the software for use and/or re-sale and/or sublicensing. In the illustrated example, the software distribution platform 1005 includes one or more servers and one or more storage devices. The storage devices store the machine readable instructions 732, which may correspond to the example machine readable instructions 300, 400, 500, 600 of FIGS. 3-6, as described above. The one or more servers of the example software distribution platform 1005 are in communication with a network 128, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 732 from the software distribution platform 1005. For example, the software, which may correspond to the example machine readable instructions 300 of FIG. 3, may be downloaded to the example processor platform 700, which is to execute the machine readable instructions 732 to implement the engagement analysis circuitry 122 of FIG. 2. In some examples, one or more servers of the software distribution platform 1005 periodically offer, transmit, and/or force updates to the software (e.g., the example machine readable instructions 732 of FIG. 7) to ensure improvements, patches, updates, etc., are distributed and applied to the software at the end user devices.

From the foregoing, it will be appreciated that example systems, methods, apparatus, and articles of manufacture have been disclosed that determine audience engagement. Disclosed systems, methods, apparatus, and articles of manufacture improve the efficiency of using a computing device by determining audience engagement and determining audience engagement classifications. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to determine audience engagement are disclosed herein. Further examples and combinations thereof include the following:

Example 1 includes a system comprising interface circuitry, programmable circuitry, and instructions to program the programmable circuitry to obtain audio of a media presentation, obtain ambient noise in an area associated with the media presentation, determine an intensity of a difference between the audio and the ambient noise, and determine an engagement level of an audience of the media presentation based on a duration the intensity satisfies a threshold value.

Example 2 includes the system of example 1, wherein the media presentation is a television program displayed on a television, the audio is audio of the television program played through a speaker, and the programmable circuitry is to obtain the audio from a first microphone directed at the speaker, and obtain the ambient noise from a second microphone directed at the area associated with the media presentation.

Example 3 includes the system of example 1, wherein the determination of the engagement level is based on an output of a neural network classifier.

Example 4 includes the system of example 1, wherein the programmable circuitry is to determine the audience is not engaged when the intensity is greater than a threshold value.

Example 5 includes the system of example 1, wherein the programmable circuitry is to determine the audience is engaged when the intensity is less than a threshold value.

Example 6 includes the system of example 1, wherein the engagement level of the audience is inversely proportional to the intensity of the difference between the audio and the ambient noise.

Example 7 includes the system of example 1, wherein the programmable circuitry is to determine if an audience member is present based on activity of a meter device.

Example 8 includes the system of example 1, wherein the determination of the engagement level is based on a genre of the audio and at least one of an audio volume change or a channel change.

Example 9 includes a computer readable medium comprising instructions which, when executed by processor circuitry, cause the processor circuitry to obtain audio of a media presentation, obtain ambient noise in an area associated with the media presentation, determine an intensity of a difference between the audio and the ambient noise, and determine an engagement level of an audience of the media presentation based on a duration the intensity satisfies a threshold value.

Example 10 includes the computer readable storage medium of example 9, wherein the media presentation is a television program displayed on a television, the audio is audio of the television program played through a speaker, and wherein the instructions, when executed, cause processor circuitry to obtain the audio from a first microphone directed at the speaker, and obtain the ambient noise from a second microphone directed at the area associated with the media presentation.

Example 11 includes the computer readable storage medium of example 9, wherein the determination of the engagement level is based on an output of a neural network classifier.

Example 12 includes the computer readable storage medium of example 9 wherein the instructions, when executed, cause the processor circuitry to determine the audience is not engaged when the intensity is greater than a threshold value.

Example 13 includes the computer readable storage medium of example 9 wherein the instructions, when executed, cause the processor circuitry to determine the audience is engaged when the intensity is less than a threshold value.

Example 14 includes the computer readable storage medium of example 9, wherein the engagement level of the audience is inversely proportional to the intensity of the difference between the audio and the ambient noise.

Example 15 includes the computer readable storage medium of example 9, wherein the programmable circuitry is to determine if an audience member is present based on activity of a meter device.

Example 16 includes the computer readable storage medium of example 9, wherein the determination of the engagement level is based on a genre of the audio and at least one of an audio volume change or a channel change.

Example 17 includes a method comprising obtaining, by executing an instruction with processor circuitry, audio of a media presentation, obtaining, by executing an instruction with the processor circuitry, ambient noise in an area associated with the media presentation, determining, by executing an instruction with the processor circuitry, an intensity of a difference between the audio and the ambient noise, and determining, by executing an instruction with the processor circuitry, an engagement level of an audience of the media presentation based on a duration the intensity satisfies a threshold value.

Example 18 includes the method of example 17, wherein the media presentation is a television program displayed on a television, the audio is audio of the television program played through a speaker, and further including obtaining the audio from a first microphone directed at the speaker, and obtaining the ambient noise from a second microphone directed at the area associated with the media presentation.

Example 19 includes the method of example 17, wherein the determining of the engagement level is based on an output of a neural network classifier.

Example 20 includes the method of example 17, further including determining the audience is not engaged when the intensity is greater than a threshold value.

Example 21 includes the method of example 17, further including determining the audience is engaged when the intensity is less than a threshold value.

Example 22 includes the method of example 17, wherein the engagement level of the audience is inversely proportional to the intensity of the difference between the audio and the ambient noise.

Example 23 includes the method of example 17, further including determining if an audience member is present based on activity of a meter device.

Example 24 includes the method of example 17, further including determining the engagement level based on a genre of the audio and at least one of an audio volume change or a channel change.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The invention claimed is:

1. A system comprising:
a processor; and
a memory storing instructions that, when executed by the processor, cause the system to perform operations comprising:
obtaining an audio of a media presentation;
obtaining ambient noise in an area associated with the media presentation; and
determining an engagement level of an audience of the media presentation based on an intensity of a difference between the audio and the ambient noise, wherein the engagement level of the audience is inversely proportional to the intensity of the difference between the audio and the ambient noise e between the audio and the ambient noise is determined as a continuous value over the duration of the media presentation.

2. The system of claim 1, wherein determining the engagement level of the audience of the media presentation based on the intensity of the difference between the audio and the ambient noise comprises:
determining the engagement level based on a duration of the intensity of the difference between the audio and the ambient noise.

3. The system of claim 1, wherein the operations further comprise:
transmitting the engagement level of the audience of the media presentation to a remote server.

4. The system of claim 1, wherein the media presentation is a television program displayed on a television, the audio is a speaker audio of the television program played through a speaker, and wherein the operations further comprise:
obtaining the audio from a first microphone directed at the speaker; and
obtaining the ambient noise from a second microphone directed at the area associated with the media presentation.

5. The system of claim 1, wherein determining the engagement level of the audience of the media presentation comprises:
determining the engagement level of the audience of the media presentation based on an output of a neural network classifier.

6. The system of claim 1, wherein the operations further comprise:
determining if an audience member is present based on activity of a meter device.

7. The system of claim 1, wherein the engagement level of the audience of the media presentation is based further on an audio volume change, or a channel change.

8. The system of claim 1, wherein the audio of the media presentation is a first audio, the ambient noise is a first ambient noise, and wherein the operations further comprise:
obtaining a second audio of the media presentation;
obtaining a second ambient noise in the area associated with the media presentation; and
adjusting the engagement level of the audience of the media presentation based on an intensity of a difference between the second audio and the second ambient noise.

9. The system of claim 1, wherein the operations further comprise:
obtaining media identifying information for the media presentation;
obtaining one or more audience member identifiers for the audience of the media presentation; and
associating the media identifying information and the one or more audience member identifiers with the engagement level of the audience of the media presentation.

10. The system of claim 1, wherein determining the engagement level of the audience of the media presentation comprises:
determining the engagement level based on a type of the media presentation.

11. The system of claim 10, wherein the type of the media presentation is a genre of the media presentation.

12. A method comprising:
obtaining an audio of a media presentation;
obtaining ambient noise in an area associated with the media presentation; and
determining an engagement level of an audience of the media presentation based on an intensity of a difference between the audio and the ambient noise, wherein the engagement level of the audience is inversely proportional to the intensity of the difference between the audio and the ambient noise and wherein the intensity of the difference between the audio and the ambient noise is determined as a continuous value over a duration of the media presentation.

13. The method of claim 12, wherein determining the engagement level of the audience of the media presentation based on the intensity of the difference between the audio and the ambient noise comprises:

determining the engagement level based on a duration of the intensity of the difference between the audio and the ambient noise.

14. The method of claim 12, further comprising:

transmitting the engagement level of the audience of the media presentation to a remote server.

15. The method of claim 12, wherein the media presentation is a television program displayed on a television, the audio is a speaker audio of the television program played through a speaker, and wherein the method further comprises:

obtaining the audio from a first microphone directed at the speaker; and obtaining the ambient noise from a second microphone directed at the area associated with the media presentation.

16. The method of claim 12, wherein determining the engagement level of the audience of the media presentation comprises:

determining the engagement level of the audience of the media presentation based on an output of a neural network classifier.

17. The method of claim 12, further comprising:

determining if an audience member is present based on activity of a meter device.

18. The method of claim 12, wherein the engagement level of the audience of the media presentation is based further on an audio volume change, or a channel change.

19. The method of claim 12, wherein the audio of the media presentation is a first audio, the ambient noise is a first ambient noise, and wherein the method further comprises:

obtaining a second audio of the media presentation;

obtaining a second ambient noise in the area associated with the media presentation; and adjusting the engagement level of the audience of the media presentation based on an intensity of a difference between the second audio and the second ambient noise.

20. A non-transitory computer readable storage medium having stored thereon program instructions that, upon execution by a processor, cause performance of operations comprising:

obtaining an audio of a media presentation;

obtaining ambient noise in an area associated with the media presentation; and determining an engagement level of an audience of the media presentation based on an intensity of a difference between the audio and the ambient noise, wherein the engagement level of the audience is inversely proportional to the intensity of the difference between the audio and the ambient noise, and wherein the intensity of the difference between the audio and the ambient noise is determined as a continuous value over a duration of the media presentation.

\* \* \* \* \*